March 25, 1952 J. T. L. BROWN 2,590,228
METHOD OF ADJUSTING POLAR RELAYS
Filed Dec. 31, 1948
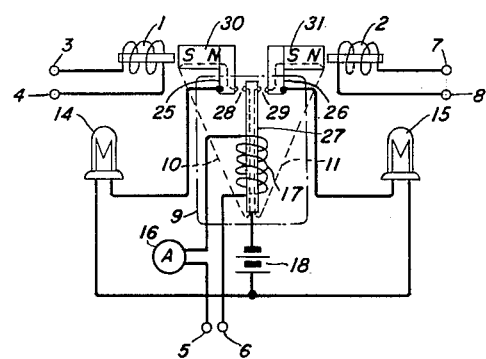
INVENTOR
J. T. L. BROWN
BY
J. W. Schmied
ATTORNEY

Patented Mar. 25, 1952

2,590,228

UNITED STATES PATENT OFFICE 2,590,228

METHOD OF ADJUSTING POLAR RELAYS

John T. L. Brown, Short Hills, N. J., assignor to Bell Telephone Laboratories, Incorporated, New York, N. Y., a corporation of New York Application December 31, 1948, Serial No. 68,690

3 Claims. (Cl. 175—320)

This invention relates to a method for adjusting the sensitivity of a particular type relay herein defined as a polar relay.

A polar relay is characterized, in general, by a structure wherein an armature having a coil wound thereon is positioned in a space gap between two pole-pieces, each of said pole-pieces having a magnetic field of different polarity applied thereto by an associated pole-piece permanent magnet. Electrical contacts are positioned on both of said pole-pieces and said armature so that the relay has two operating or make contact positions thereby enabling single-pole, double-throw switching by contact of said armature with one or the other of said pole-pieces.

In polar relays having a first type of sensitivity adjustment, if said armature is making contact with one of said pole-pieces, current flow of a certain amplitude through said armature winding in a direction which will repel said armature from said pole-piece will force the armature against the other of said pole-pieces. Subsequent reversal of the current flow with the same or different amplitudes through the armature winding will repel the armature so that it will again make contact with the first of said pole-pieces. In polar relays having a second type of sensitivity adjustment, if said armature is making contact with one of said pole-pieces, current flow of a certain amplitude through the armature winding will repel said armature from the contacted pole-piece to the other of said pole-pieces. A reduction of the current flow without reversal of the direction of flow will repel the armature so that it will again make contact with the originally contacted pole-piece. For a given relay structure the strength of the pole-piece permanent magnets will determine the current amplitude or amplitudes required in the armature winding before said armature will traverse the space gap between the pole-pieces.

It is an object and feature of this invention to accurately adjust the magnetic field applied to both of said pole-pieces by alternately demagnetizing over-magnetized pole-piece permanent magnets in small increments until said armature will traverse the space gap between said pole-pieces in a first direction in response to a specified minimum current flow through the armature winding and in the opposite direction in response to a reverse current flow of the same minimum value.

Another object and feature of this invention is to accurately adjust the magnetic field applied to both of said pole-pieces by alternately demagnetizing over-magnetized pole-piece permanent magnets in small increments until said armature will traverse the space gap between said pole-pieces in a first direction in response to a first specified minimum current flow through the armature winding and in the opposite direction in response to a different specified value of current flow through said armature winding, said different value of current flow being either in the same or reverse direction of current flow as compared to the direction of the first specified minimum current flow.

In the manufacture of relays of the prior art, particularly neutral armature relays where no biasing permanent magnet is employed, sensitivity adjustment is usually achieved by mechanical bending of parts thereof or by screw adjustment or movement of other parts thereof. This adjustment may change from time to time and further adjustments will be needed.

In the type of relay to be adjusted by this invention mechanical adjustment is not possible after assembly of the relay since the armature and winding thereof and part of each pole-piece of said relay are usually sealed in glass. The pole-pieces extend through the walls of a glass envelope and are fastened externally to the pole-piece permanent magnets, each pole-piece being fastened to an individual pole-piece permanent magnet so as to magnetize said pole-pieces. A metal container is placed around the relay assembly for shielding purposes and also to minimize the magnetic reluctance of the magnetic meshes of the relay.

The apparatus for practicing the invention comprises two demagnetizing electromagnets through which there can individually be passed an alternating-current impulse or impulses of a desired strength and for a desired length of time. The demagnetizing electromagnets are coupled by close physical positioning to the pole-piece permanent magnets of the relay to be adjusted so as to attain a desired relay sensitivity by alternately demagnetizing the pole-piece permanent magnets in small determined increments.

Specifically, sensitivity adjustment is accomplished by demagnetizing an over-magnetized pole-piece permanent magnet by the application in alternating-current impulses to the demagnetizing electromagnet associated therewith until the armature is capable of freeing itself when in contact with the pole-piece, which is fastened to said pole-piece permanent magnet, in response to a first specified minimum value of current flow through the armature winding. With this occurrence the second pole-piece permanent magnet is demagnetized by the application of alternating-current impulses of the demagnetizing electromagnet associated therewith until the armature is again capable of freeing itself when in contact with the second pole-piece, which is fastened to said second pole-piece permanent magnet, in response to the same specified minimum value of current flow through the armature winding but in a reverse direction, or a different specified minimum value of current flow in a reverse direction, or a second specified current flow through the armature winding but in the same direction as the case may require. Because the strength of both pole-piece permanent magnets affects the current required to be passed through the armature winding for a given armature swing, a method of alternately demagnetizing one and then the other in small increments will result in asymptotically approaching the value of magnetization necessary for each of said pole-piece permanent magnets when a first specified current flow through the armature winding is required to cause the armature to swing from one pole-piece to another and a second specified current flow through the armature winding is required to cause the armature to swing in the reverse direction.

The invention, its nature and objects will be more readily understood from the drawings and the following detailed description thereof.

In the drawing a diagrammatic representation of a typical polar type relay is shown. Said relay comprises an armature 27 positioned between two pole-pieces 25 and 26 so as to make contact therewith by making one or the other of contact pairs 28 and 29. Pole-piece permanent magnets 30 and 31 are fastened to pole-pieces 25 and 26, respectively, so as to magnetize same. Said pole-pieces are constructed of material capable of being magnetized and are sealed in the wall of glass envelope 9, with the associated pole-piece permanent magnets externally affixed thereto. With such an arrangement the opposite ends of the pole-piece permanent magnets can be positioned closely to demagnetizing electromagnets 1 and 2.

Polar type relays are characterized by two magnetic meshes which are shown schematically in the drawing by dotted line loops 10 and 11. By varying the direction and/or intensity of current flow through armature winding 17 the magnetic flux density of magnetic loop 10 or 11 will predominate thereby causing armature 27 to close contact pair 28 or 29 depending upon the magnetic polarity and/or intensity of the contact end of armature 27. In general, therefore, by varying the direction and/or amplitude of current flow through armature winding 17 single-pole, double-throw switch operations can be attained by a polar type relay. The complete magnetic loop for mesh 10 comprises a magneti-motive force induced by armature winding 17 in armature 27 and magnetism induced in pole-piece 25 by pole-piece permanent magnet 30 being coupled thereto, whereas the complete magnetic loop for loop 11 comprises magnetism induced in armature 27 by armature winding 17 and magnetism induced in pole-piece 26 by pole-piece permanent magnet 31 being coupled thereto. By varying the direction and/or intensity of the magnetic lines of force induced in armature 27 said armature will move either to the left or to the right depending upon the polarity of pole-pieces 25 and 26 with respect to the armature. For polar type relay action the pole-piece permanent magnets have an opposite magnetic polarity with respect to one another.

In order to facilitate a detailed explanation of the steps of the method herein disclosed three possible sets of polar relay sensitivity adjustments are outlined: (1) Armature swing from a first pole-piece to a second pole-piece in response to a specified minimum current flow $A_1$ through armature winding 17 in such a direction as to repel said armature from the first pole-piece; and the reverse armature swing from the second pole-piece to the first pole-piece in response to a specified minimum current flow $B_1$ equal in amplitude to $A_1$ but flowing in a reverse direction through armature winding 17 as compared to the direction of flow of $A_1$; (2) armature swing from a first pole-piece to a second pole-piece in response to a specified minimum current flow $A_2$ through armature winding 17 in such a direction as to repel said armature from the first pole-piece; and the reverse armature swing from the second pole-piece to the first pole-piece in response to a specified minimum current flow $B_2$ less than the amplitude of $A_2$ and also flowing in a reverse direction through armature winding 17 as compared to the direction of flow of $A_2$; (3) armature swing from a first pole-piece to a second pole-piece in response to a specified minimum current $A_3$ through armature winding 17 in such a direction as to repel said armature from the first pole-piece; and the reverse armature swing from the second pole-piece to the first pole-piece in response to a current $B_3$ less than the amplitude of $A_3$ by a specified value but in the same direction of flow.

Furthermore, let it be assumed that pole-piece permanent magnets 30 and 31 have a magnetic polarity as shown in the drawing; and that they are so strongly magnetized that if armature 27 makes contact with either of pole-piece 25 and 26, a current flow equal to $A_1$, or $A_2$ or $A_3$ through armature winding 17 will be unable to force the armature toward the opposite pole-piece because of the magnetic strength of the contacted pole-piece permanent magnet.

To initiate the sensitivity adjustment any one of pole-piece permanent magnets 30 or 31 selected at random, for example 31, should be demagnetized by the application of one or more alternating-current impulses to terminals 7 and 8 thereby energizing demagnetizing electromagnet 2. The magnetic impulse or impulses therefrom will demagnetize pole-piece 31 in an amount depending directly upon the magnetic amplitude of said impulses. It is desirable to begin the demagnetization step by passing a small amplitude current through demagnetizing electromagnet 2. Tests have shown that the number of demagnetizing alternating-current cycles applied to a demagnetizing electromagnet does not seem to affect the degree of demagnetization of the associated pole-piece permanent magnet appreciably; whereas, the amplitude of the alternating current impulse or impulses directly affects the degree of demagnetization. Accordingly, it is not necessary to apply the alternating-current potential to terminals 7 and 8 for more than a short time interval, the shortest interval being the time required for a single alternating-current alternation of a demagnetizing polarity to be passed through demagnetizing electromagnet 2.

Having demagnetized pole-piece permanent magnet 31, a "reset" current is applied to terminals 5 and 6 with such an amplitude and direction of flow as to cause said armature 27 to close contact 29 if said contact is not already closed, the amplitude of said current being indicated by milliammeter 16. When this is accomplished lamp 15 will be illuminated by current flow from battery 18 through a circuit which includes closed contact 29. The lamp is not a necessary part of the adjusting apparatus in the case where the armature position with respect to the adjacent pole-pieces is easily visible; however, many polar type relays are enclosed so that the armature position is not easily ascertainable, and in such cases armature position lamps such as 14 and 15 are desirable. With armature 27 making contact 29 a current $A_1$, or $A_2$, or $A_3$, hereinafter called the "test" current, as required for the particular relay adjustment necessary, is caused to flow through armature winding 17 by the application of a potential to terminals 5 and 6 with pole-piece 26 being the first pole-piece set forth in the above-mentioned three sensitivity adjustment cases. If the armature swings to pole-piece 25 with the application of the "test" current, pole-piece permanent magnet 31 has been demagnetized sufficiently. However, if armature 27 does not swing to pole-piece 25, pole-piece permanent magnet 31 is again demagnetized by passing slightly increased amplitude alternating-current impulses through demagnetizing electromagnet 2, the "test" current having, preferably, been removed from armature winding 17. After the second demagnetization step the "reset" current potential is then applied to terminals 5 and 6 thereby causing armature 27 to close contact 29, which event is indicated by the illumination of lamp 15. If the armature happens to be in this position the "reset" current potential need not be applied. The test current $A_1$, or $A_2$, or $A_3$ is then again caused to flow through armature winding 17 by the application of a potential to terminals 5 and 6 and if pole-piece permanent magnet 31 has been sufficiently demagnetized by the second demagnetization step the armature will swing to the pole-piece 25. If pole-piece permanent magnet 31 has not been sufficiently demagnetized, however, the armature will not swing to pole-piece 25 and an additional demagnetization step or steps is required until "test" current $A_1$, or $A_2$, or $A_3$ will cause said armature to swing to pole-piece 25.

When pole-piece permanent magnet 31 has been sufficiently demagnetized so that a current $A_1$, or $A_2$ or $A_3$ will cause the armature to swing to pole-piece 25, demagnetizing electromagnet 1 is then energized by the application of small value alternating-current impulses to terminals 3 and 4. After the initial demagnetization of pole-piece permanent magnet 30, if contact 28 is not closed, armature 27 is "reset" by the application of a potential to terminals 5 and 6 with such an amplitude and direction of current flow as to cause said armature to contact pole-piece 25 thereby closing contact 28. The armature 27 having been "reset", if required, a "test" current $B_1$, or $B_2$ or $B_3$, as the case may be, is caused to flow through armature winding 17 by the application of a potential to terminals 5 and 6 and if said current causes armature 27 to swing to pole-piece 26 then pole-piece permanent magnet 30 has been sufficiently demagnetized. If the armature does not swing to pole-piece 26, pole-piece permanent magnet 30 is again demagnetized by a slightly increased amplitude alternating-current potential applied to terminals 3 and 4 thereby energizing demagnetizing electromagnet 1. If said armature, having been reset, now swings to pole-piece 26 with the application of the "test" current, pole-piece permanent magnet 30 has been sufficiently demagnetized. However, if said armature does not swing to the pole-piece 26 then the demagnetization, "reset" and "test" current steps must be repeated again with a still greater amplitude alternating-current potential applied to terminals 3 and 4. These steps should be repeated until pole-piece permanent magnet 30 is sufficiently demagnetized so that armature 27 will swing to pole-piece 26 with the application of "test" current $B_1$, or $B_2$ or $B_3$ to armature winding 17.

Pole-piece permanent magnet 30 having been sufficiently demagnetized, pole-piece permanent magnet 31 is again demagnetized, the operator going through the demagnetization, "reset" and "test" current steps hereinbefore outlined preferably applying an increased amplitude alternating-current potential to terminals 7 and 8 and terminals 3 and 4 as the case may be as compared to the potentials previously used.

Ultimately by alternately demagnetizing pole-piece permanent magnet 31 and pole-piece permanent magnet 30, a point will be reached whereat the armature will traverse from a first pole-piece to a second pole-piece and the reverse direction in response to the armature winding current or currents specified without any further demagnetization of the pole-piece permanent magnets. When this point is attained the polar relay has been sufficiently adjusted for sensitivity.

It is to be understood that the above-described method steps are illustrative of the application of the principles of this invention and numerous other modifications of the method disclosed may be devised by those skilled in the art without departing from the scope of the invention.

What is claimed is:

1. In a method for adjusting the sensitivity of unadjusted polar relays of the type wherein an armature is to be actuated in response to currents of specified amplitudes and directions of flow through a winding which is magnetically coupled to said armature so as to cause said armature to make contact with one or the other of two pole-pieces which are initially over-magnetized for the winding current sensitivity values ultimately required by two permanent magnets of opposite polarity individually associated therewith, the steps comprising the permanent demagnetization of any one of said over-magnetized permanent magnets in small increments until a first sensitivity current through said winding of specified amplitude and a direction of flow which magnetizes the armature to an opposite magnetic polarity with respect to said demagnetized permanent magnet is capable of causing the armature to move away from the pole-piece associated with the demagnetized permanent magnet if said armature is in contact therewith thereby contacting the armature with the opposite pole-piece, the permanent demagnetization of the other of said permanent magnets in small increments until a second sensitivity current value flowing through said winding is capable of causing the armature to move away from the pole-piece associated with the second demagnetized permanent magnet if said armature is in contact therewith thereby contacting the armature with the opposite pole-piece, and the repeating of these demagnetization steps until no further demagnetization of either permanent magnet is required to render the armature capable of traversing from one pole-piece to the other pole-piece in response to said first sensitivity current of specified amplitude and direction of flow and in the reverse direction in response to said second sensitivity current of specified amplitude and direction of flow.

2. In a method as defined in claim 1 a sensitivity adjustment wherein said first and second sensitivity currents have the same amplitude but different directions of flow through said winding.

3. In a method as defined in claim 1 a sensitivity adjustment wherein said first and second sensitivity currents have the same direction of current flow through said winding but different amplitudes.

JOHN T. L. BROWN.

REFERENCES CITED

The following references are of record in the file of this patent:

UNITED STATES PATENTS

| Number | Name | Date |
|---|---|---|
| 1,508,237 | Murdock | Sept. 9, 1924 |
| 2,427,750 | Snyder | Sept. 23, 1947 |
| 2,452,034 | Campbell | Oct. 26, 1948 |
| 2,468,308 | Schwartz | Apr. 26, 1949 |